(12) United States Patent
Weiss

(10) Patent No.: US 8,838,678 B1
(45) Date of Patent: Sep. 16, 2014

(54) DYNAMIC CASCADING FOR NETWORK SITES

(75) Inventor: William L. Weiss, Las Vegas, NV (US)

(73) Assignee: Zappos IP, Inc., Henderson, NV (US)

( * ) Notice: Subject to any disclaimer, the term of this patent is extended or adjusted under 35 U.S.C. 154(b) by 873 days.

(21) Appl. No.: 12/851,695

(22) Filed: Aug. 6, 2010

(51) Int. Cl.
*G06F 15/16* (2006.01)

(52) U.S. Cl.
USPC .......................................... 709/203

(58) Field of Classification Search
USPC .......................................... 709/203
See application file for complete search history.

(56) References Cited

U.S. PATENT DOCUMENTS

| | | | | |
|---|---|---|---|---|
| 6,119,153 | A * | 9/2000 | Dujari et al. | 709/218 |
| 6,701,415 | B1 * | 3/2004 | Hendren, III | 711/138 |
| 2002/0178211 | A1 * | 11/2002 | Singhal et al. | 709/201 |
| 2005/0120061 | A1 * | 6/2005 | Kraft | 707/203 |
| 2010/0235585 | A1 * | 9/2010 | Dowlatkhah | 711/136 |

* cited by examiner

*Primary Examiner* — Rupal Dharia
*Assistant Examiner* — Robert B McAdams
(74) *Attorney, Agent, or Firm* — Thomas Horstemeyer, LLP

(57) ABSTRACT

Disclosed are various embodiments for providing dynamic cascading for network sites. A request for a resource is obtained from a client. The request includes a version identifier. A location of resource data is resolved for generating the resource. Data associated with the request determines a resource group. The resource group specifies a sequenced listing of resource groups. The location is a first one of the sequenced listing of resource groups in which the resource data is present. The resource is generated from the resource data for presentation to the client. The resource data is loaded from a data cache when the version identifier is less than or equal to a version identifier associated with the resource data in the data cache. The resource data is loaded from a data store when the version identifier is greater than the version identifier associated with the resource data in the data cache.

20 Claims, 6 Drawing Sheets

DYNAMIC CASCADING FOR NETWORK SITES

BACKGROUND

Managing multiple network sites can be time intensive and frustrating. If an organization maintains multiple network sites, often a same type of update will need to be made to each of the network sites. The network sites may have a similar structure but may be based on different code, which can complicate the update process. Further, although a network site may be updated, proxy servers or other servers that cache content of the network site may continue to serve up outdated network pages and/or other resources.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to providing dynamic cascading for network sites. Because multiple network sites may share similar features or code, various embodiments of the present disclosure enable network sites to inherit resources dynamically from a cascade of resource groups. In addition, network pages or other resources may include variants, or text strings, that may be inherited from a cascade of resource groups as well. Moreover, resources may be served up with version identifiers to enable caching servers to recognize updates and to facilitate efficient internal caching of the latest resource versions. In the following discussion, a general description of the system and its components is provided, followed by a discussion of the operation of the same.

Figure 1:
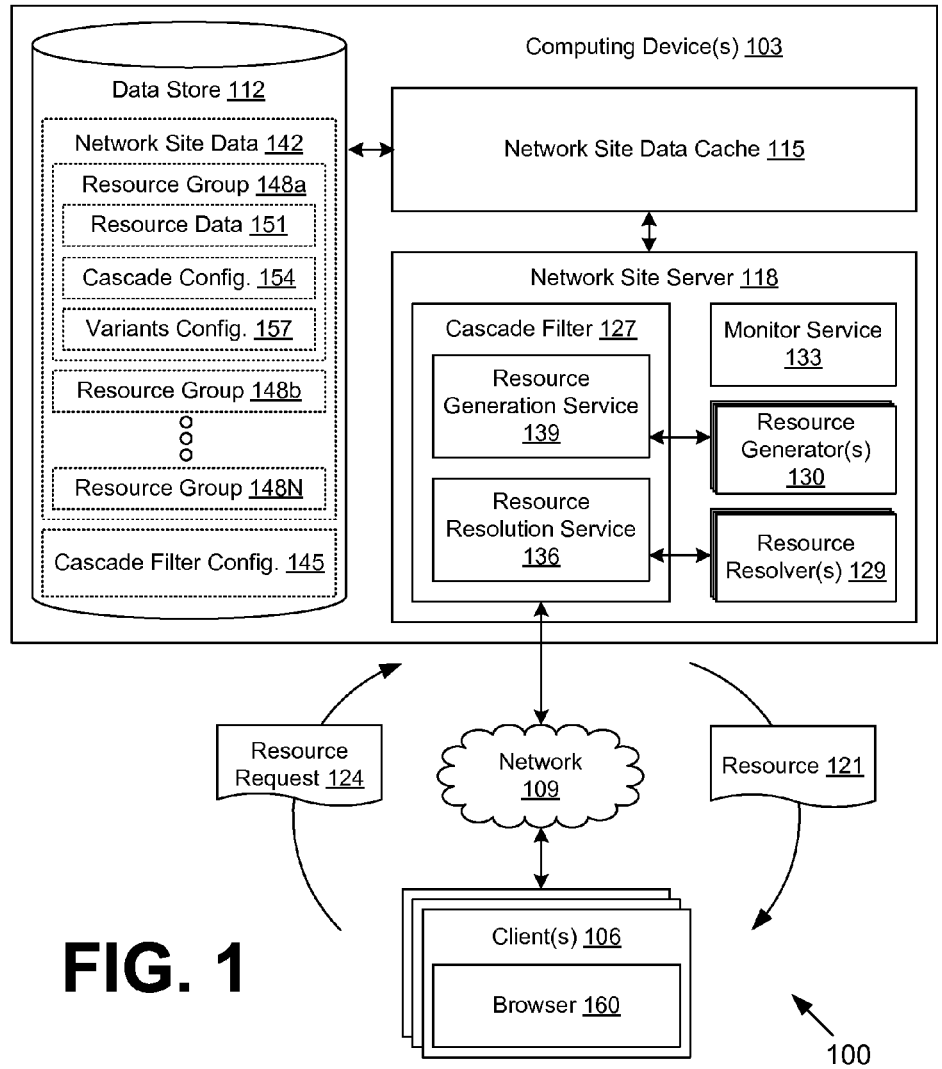
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise, for example, a cloud computing resource, a grid computing resource, and/or any other distributed computing arrangement. Such computing devices 103 may be located in a single installation or may be dispersed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores as can be appreciated. The data stored in the data store 112, for example, is associated with the operation of the various applications and/or functional entities described below. Also, various data obtained from the data store 112 may be cached within one or more network site data caches 115. In one embodiment, a data store 112 is maintained on one computing device 103, and multiple computing devices 103 each include a corresponding network site data cache 115. Accordingly, accesses to the data store 112 may be reduced through the use of the network site data caches 115, and the data cached in the network site data caches 115 may be served up with less latency.

The components executed on the computing device 103, for example, include a network site server 118 and other applications, services, processes, systems, engines, or functionality not discussed in detail herein. The network site server 118 is executed to serve up resources 121 in response to resource requests 124. As used herein, "network site" may refer to any web site, file transfer protocol (FTP) site, gopher site, or other site that is accessible through a domain name, path name, and/or other form of identification.

Resources 121 may include, for example, network pages, style sheets, scripting code, documents, images, video, audio, software, interactive environments, databases, files, and/or any other data that may be served up from a network site. Resource requests 124 may include, for example, uniform resource locators (URLs), file names, security credentials, form data, uploaded data, and/or any other data typically included in a request for a resource 121. The network site server 118 may comprise a commercially available hypertext transfer protocol (HTTP) server or servlet container such as, for example, Apache® HTTP Server, Microsoft® Internet Information Services, Apache® Tomcat®, and other server applications.

The network site server 118 may incorporate various components, including, for example, a cascade filter 127, one or more resource resolvers 129, one or more resource generators 130, a monitor service 133, and/or other components. The cascade filter 127 may be configured to receive and process a resource request 124, for example, using a resource resolution service 136 and a resource generation service 139. The resource resolution service 136 may be configured to determine a location of the resource 121 within the computing device 103 based in part on a URL and/or other information that may be associated with the resource request 124. To this end, the resource resolution service 136 may forward information associated with the resource request 124 to an appropriate resource resolver 129. Various resource resolvers 129 may be configured, for example, to determine a location of the resource 121 based on a URL, cookie parameters, timestamp, season of the year, user location, internet protocol (IP) address, and/or other data.

The resource generation service 139 is configured to generate the resource 121 based on various data and type of resource 121. To this end, the resource generation service 139 may forward the resource 121 location, resolved from the resource request 124 and/or data used in generating the resource 121, to an appropriate resource generator 130. The resource generator 130, if applicable, may merely forward data comprising the resource 121 onward to the client 106 or may process the data in a transformative way.

As a non-limiting example, the data may comprise a network page template, and the resource generator 130 may be configured to generate a network page from the network page template. As another non-limiting example, the data may comprise an uncompressed image file, and the resource generator 130 may be configured to generate a compressed image file with a watermark. As yet another non-limiting example, the data may comprise pulse-code-modulated audio, and the resource generator 130 may be configured to generate perceptually encoded audio that is formatted for streaming transmission over the network 109. In various embodiments, the resource generators 130 may comprise commercially available scripting or template engines such as, for example, FreeMarker, Apache® Velocity, and so on.

The monitor service 133 may comprise one or more processes or threads that are configured to monitor the data stored in the data store 112 used in generating the resources 121 to determine whether new resources 121 are now available through the network site. Further, the monitor service 133 may be configured to load or copy such data to the respective network site data cache 115. The monitor service 133 may be configured to poll the data store 112 for additions or may be notified when an addition of a resource 121 is made.

The data stored in the data store 112 includes, for example, network site data 142, a cascade filter configuration 145, and potentially other data. The network site data 142 may include any data that may be used in serving up a network site. For example, network site data 142 may include resources 121 and/or data used in generating resources 121 such as templates, code, text, unprocessed data, uncompressed data, etc.

The network site data 142 may be organized into a plurality of resource groups 148a, 148b ... 148N. In one embodiment, the data store 112 may correspond to a file system, and the resource groups 148 may correspond to directories in the file system. The file system may, for example, comprise a networked file system, a distributed file system, a local file system, or other file system. In another embodiment, the data store 112 may correspond to a relational database management system (RDBMS), and the resource groups 148 may correspond to databases or tables accessible through the RDBMS. In one embodiment, each of a plurality of network sites hosted by the network site server 118 may correspond to a separate one of the resource groups 148. Although a network site may correspond to a resource group 148, it may be the case that a resource group 148 does not correspond to a network site and instead merely corresponds, for example, to a code base or library.

Each resource group 148 may include, for example, resource data 151, a cascade configuration 154, a variants configuration 157, and other data. The resource data 151 corresponds to the resources 121 or the data used to generate resources 121 that are stored in association with the particular resource group 148. The cascade configuration 154 may comprise a listing of resource groups 148, which may be sequenced, that define a cascade for that resource group 148.

In other words, if a resource 121 is not available in the resource data 151 of the resource group 121, it may be available in another resource group 148 defined in the cascade configuration 154. Multiple resource groups 148 may be included in a cascade configuration 154 and may be consulted sequentially, randomly, or in another order. As a non-limiting example, the cascade configuration 157 may comprise a text file containing comma-separated values, a data table, an extensible markup language (XML) file, or some other data record.

The variants configuration 157 may define a set or hierarchy of variants for replacement in the resources 121. As a non-limiting example, a variant may comprise a text string, an image, or any other data item that may be substituted in place of an identifier in a resource 121 when the resource 121 is generated by a resource generator 130. Variants for a resource group 148 may be explicitly defined in the variants configuration 157 for that resource group 148 or may be inherited from variants configurations 157 associated with other resource groups 148 in the cascade. In one embodiment, the variants configuration 157 may define a different cascade for the purpose of inheriting variants. In one embodiment, the presence of a variant in a variants configuration 157 will override a variant having the same identifier in inherited variants configurations 157. Furthermore, in one embodiment, a change made in one variants configuration 157 may trigger the reevaluation of all variants configurations 157 that are inherited in a cascade. As a non-limiting example, the variants configuration 157 may comprise a text file containing comma-separated values, a data table, an XML file, or some other data record.

The cascade filter configuration 145 may provide configuration parameters for the cascade filter 127. For example, the cascade filter configuration 145 may define which file types are processed by which resource generators 130. To this end, the cascade filter configuration 145 may define include and/or exclude lists of files, file types, file extensions, directories, etc. for processing by particular resource generators 130. The cascade filter configuration 145 may also define which types of resources 121 are to be given a version identifier to track version changes and ensure cache consistency. The cascade filter configuration 145 may also specify mappings between URLs, domain names, and path names and particular resource groups 148.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, or other devices with like capability.

The client 106 may be configured to execute various applications such as a browser 160 and/or other applications. The browser 160 may be executed in a client 106, for example, to access and render network pages, such as web pages, or other network content served up by the computing device 103 and/or other servers. The client 106 may be configured to execute applications beyond the browser 160 such as, for example, email applications, instant message applications, and/or other applications.

Next, a general description of the operation of the various components of the networked environment 100 is provided. To begin, a user at a browser 160 selects, clicks on, or otherwise inputs a URL corresponding to a resource 121 provided on a network site hosted by the network site server 118. A resource request 124 is generated and sent to the network site server 118 by way of the network 109. The resource request 124 is directed to the cascade filter 127, wherein the resource resolution service 136 resolves the location of resource data 151 corresponding to the resource request 124. The resource resolution service 136 may pass the resource request 124 to one or more resource resolvers 129 for resolution. The resource resolvers 129 may consult, for example, the cascade filter configuration 145 and/or other data for the mapping of the resource request 124 to the resource group 148.

Once the corresponding resource data 151 is located, the resource generation service 139 may then generate the resource 121 for answering the resource request 124. The corresponding resource data 151 may be loaded from the network site data cache 115 if it is present in the network site data cache 115. A URL associated with the resource request 124 may include a version identifier. Such a version identifier may comprise a physical timestamp, a logical timestamp, or another type of version identifier. A version identifier for the resource 121 may be updated in the data store 112 when the resource data 151 corresponding to the resource 121 is added or updated. The resource generation service 139 may be configured to compare the version identifier from the resource request 124 with a version identifier associated with a cached copy of the resource data 151 corresponding to the resource 121.

If the requested version identifier matches the cached version identifier, or if the requested version identifier is older than the cached version identifier, the corresponding data is loaded from the network site data cache 115. If, instead, the requested version identifier is newer than the cached version identifier, the data may be loaded directly from the data store 112 or may be loaded from the data store 112 into the network site data cache 115 and loaded from the network site data cache 115. In various embodiments, the monitor service 133 may execute synchronously or asynchronously to ensure that new additions to the resource data 151 are reflected in the network site data cache 115.

The resource data 151 may be passed to a corresponding resource generator 130 on a same or different computing device 103 for generation of the resource. As a non-limiting example, the resource data 151 may comprise a network page template, and a network page is to be generated by the corresponding resource generator 130. The network page template may contain a link to another network page or other resource 121 hosted by the network site. Depending on the cascade filter configuration 145, the resource generation service 139 or a resource generator 130 may be configured to embed a version identifier within the link. The version identifier may be encoded, for example, to consume fewer characters in the link. Further, the data comprising the resource 121 may include a directive indicating that one or more links are to include a version identifier.

Other than maintaining cache consistency in the computing device 103, the version identifier may also, or instead, be used to ensure cache consistency for external caching servers operated by caching service providers, network service providers, and other providers. In modifying the URL for a resource 121, the external caching servers are thereby notified of a change to the resource 121. In one embodiment, the cascade filter 127 may remove or otherwise ignore the version identifier embedded in a resource request 124.

The resource generator 130 may then generate the resource 121 from the resource data 151 that has been loaded. In one case, the generation may involve merely returning a file. In another case, the generation may involve execution of a template engine such as FreeMarker to process and transform a network page template and substitute variant identifiers with variant replacement data as configured by a variants configuration 157 in the applicable resource group 148. It is understood that many different forms of resource 121 generation may be employed. The finished resource 121 is then returned to the client 106 over the network 109.

Figure 2:
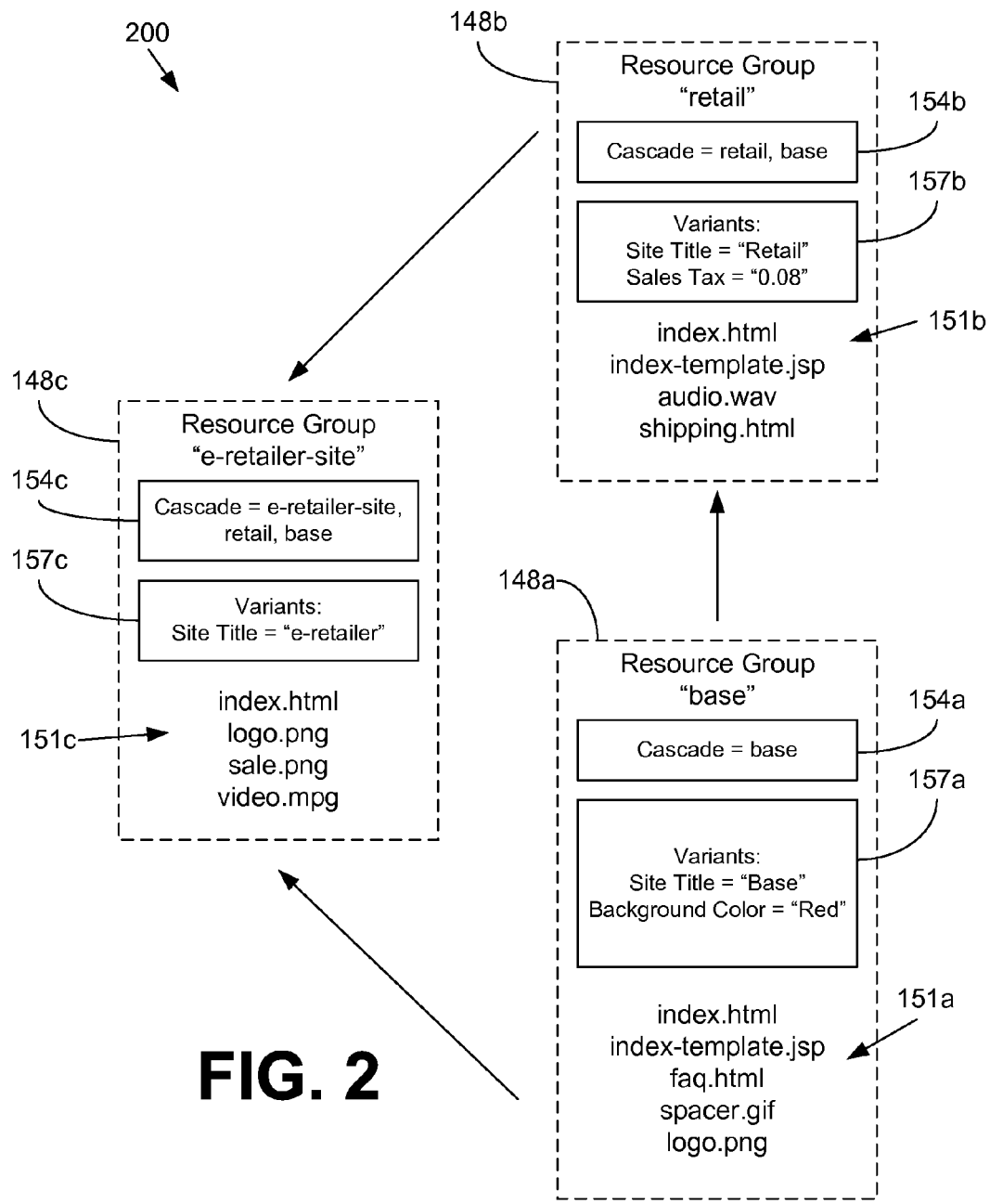
FIG. 2 is a diagram showing a cascaded resource group stored in a computing device in the networked environment of FIG. 1 according to various embodiments of the present disclosure.

Turning now to FIG. 2, shown is a diagram illustrating one example of a cascaded resource group 200 according to various embodiments. Three resource groups 148a, 148b, and 148c are depicted with arrows indicating inheritance relationships among the groups. Resource group 148a is named "base," which may correspond to a directory name, database name, table name, or other identifier that may be uniquely associated with the resource group 148a. The cascade configuration 154a specifies one entry, which is "base" itself. In one embodiment, the cascade configuration 154a may be left empty and still include resource data 151 within a search path associated with the resource group 148a. The resource group 148a also includes a variants configuration 157a specifying a "Site Title" of "Base" and a "Background Color" of "Red." The resource data 151a includes various files: "index.html," "index-template.jsp," "faq.html," "spacer.gif," "logo.png," and possibly other data.

Resource group 148b is named "retail," which may correspond to a directory name, database name, table name, or other identifier that may be uniquely associated with the resource group 148b. The cascade configuration 154b specifies two entries, which are "retail" and "base." The resource group 148b also includes a variants configuration 157b specifying a "Site Title" of "Retail" and a "Sales Tax" of "0.08." Therefore, the resource group 148b inherits the variant "Background Color" but overrides the variant "Site Title" from the resource group 148a.

The resource data 151b includes various files: "index.html," "index-template.jsp," "audio.wav," "shipping.html," and possibly other data. If resource group 148b corresponds to a network site, a resource request 124 (FIG. 1) for "index.html," "index-template.jsp," "audio.wav," or "shipping.html" would be served up from data in the resource group 148b, while a resource request 124 for "faq.html," "spacer.gif," or "logo.png" would be served up from data inherited from the resource group 148a. In other words, the "index.html" and "index-template.jsp" entries in the resource data 151b override the corresponding entries in the resource data 151a.

Resource group 148c is named "e-retailer-site," which may correspond to a directory name, database name, table name, or other identifier that may be uniquely associated with the resource group 148c. The resource resolution service 136 may be configured to resolve a domain name such as "www.e-retailer.site" to the identifier "e-retailer-site" for the resource group 148c. The cascade configuration 154c specifies three entries: "e-retailer-site," "retail," and "base." The resource group 148c also includes a variants configuration 157c specifying a "Site Title" of "e-retailer." Accordingly, the resource group 148c overrides other "Site Title" variants and inherits the "Sales Tax" and "Background Color" variants from the resource groups 148b and 148a, respectively.

The resource data 151c includes various files: "index.html," "logo.png," "sale.png," "video.mpg," and possibly other data. A resource request 124 for "index.html," "logo.png," "sale.png," or "video.mpg" would be served up from data in the resource group 148c, a resource request for "index-template.jsp," "audio.wav," or "shipping.html" would be served up from data in the resource group 148b, and a resource request 124 for "faq.html" or "spacer.gif" would be served up from data inherited from the resource group 148a. In other words, the "index.html" in the resource data 151c overrides the "index.html" in the resource data 151b, the "logo.png" in the resource data 151c overrides the "logo.png" in the resource data 151a, and the "index-template.jsp" in the resource data 151b overrides the "index-template.jsp" in the resource data 151a.

It is understood that FIG. 2 represents merely one example of the possible relationships between instances of resource groups 148. Although variants are presented as inherited in the same manner as resource data 151, variants may be configured differently according to a variants configuration 157. Additionally, inheritance may be transitive or intransitive in other embodiments.

Figure 3:
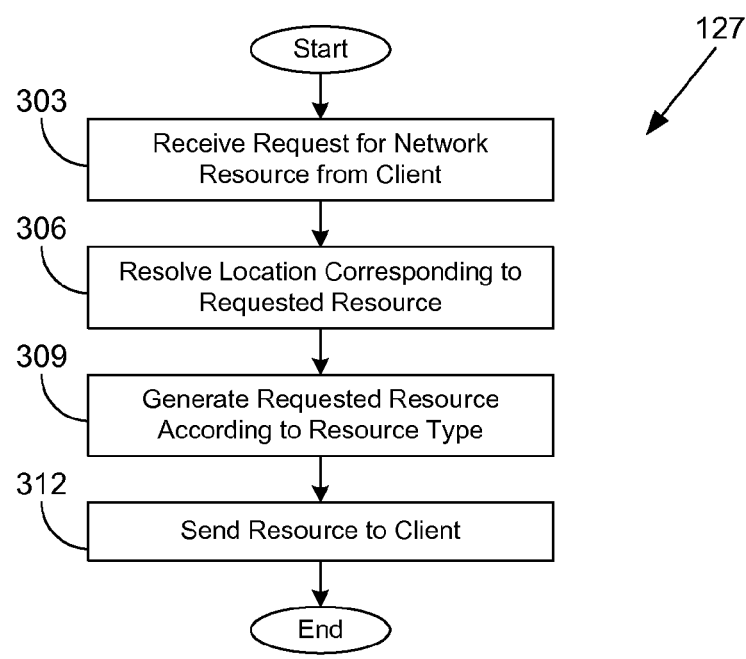
FIGS. 3-5 are flowcharts illustrating examples of functionality implemented as portions of a cascade filter of a network site server executed in a computing device in the networked environment of FIG. 1 according to various embodiments of the present disclosure.

Referring next to FIG. 3, shown is a flowchart that provides one example of the operation of a portion of the cascade filter 127 according to various embodiments. It is understood that the flowchart of FIG. 3 provides merely an example of the many different types of functional arrangements that may be employed to implement the operation of the portion of the cascade filter 127 as described herein. As an alternative, the flowchart of FIG. 3 may be viewed as depicting an example of steps of a method implemented in the computing device 103 (FIG. 1) according to one or more embodiments.

Beginning with box 303, the cascade filter 127 receives a resource request 124 (FIG. 1) from a client 106 (FIG. 1) over the network 109 (FIG. 1). In box 306, the cascade filter 127 resolves a location such as a resource group 148 (FIG. 1) corresponding to the resource request 124 and the data for generating the corresponding resource 121 (FIG. 1). The task corresponding to box 306 may be performed by a resource resolution service 136 (FIG. 1) as will be described in greater detail in connection with the flowchart of FIG. 4.

Next, in box 309, the cascade filter 127 generates the requested resource 121 according to the type of resource 121 as may be specified in the cascade filter configuration 145 (FIG. 1). The task corresponding to box 309 may be performed by a resource generation service 139 (FIG. 1) as will be described in greater detail in connection with the flowchart of FIG. 5. In box 312, the cascade filter 127 sends the resource 121 over the network 109 to the client 106. Thereafter, the portion of the cascade filter 127 ends.

Figure 4:
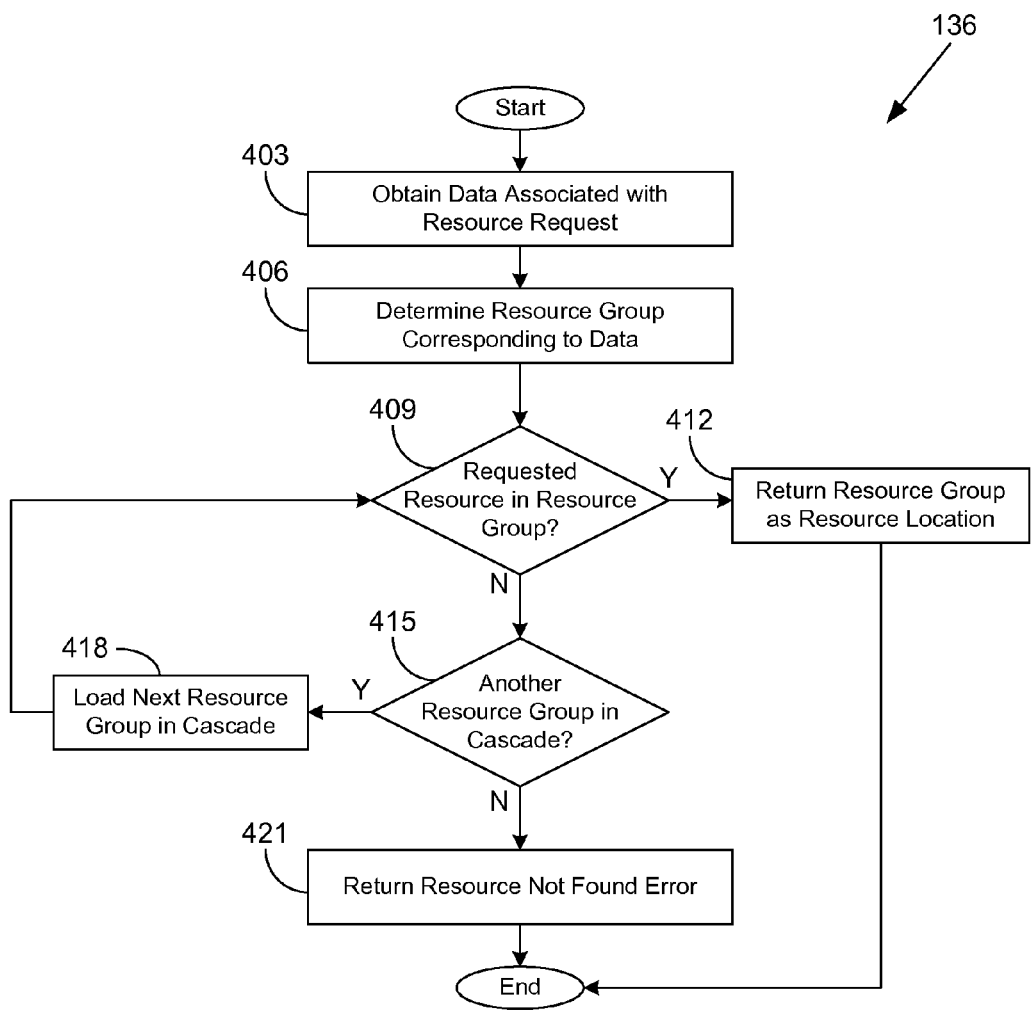

Moving on to FIG. 4, shown is a flowchart that provides one example of the operation of a portion of the resource resolution service 136 according to various embodiments. It is understood that the flowchart of FIG. 4 provides merely an example of the many different types of functional arrangements that may be employed to implement the operation of the portion of the resource resolution service 136 as described herein. As an alternative, the flowchart of FIG. 4 may be viewed as depicting an example of steps of a method implemented in the computing device 103 (FIG. 1) according to one or more embodiments.

Beginning with box 403, the resource resolution service 136 obtains data associated with a resource request 124 (FIG. 1), such as a URL. The URL may comprise, for example, a protocol identifier, a domain name or internet protocol address, a path name, and a file name. In box 406, the resource resolution service 136 determines a resource group 148 (FIG. 1) that corresponds to the data. In one embodiment, resource resolution service 136 may examine the base URL, which may comprise, for example, a domain name or IP address along with a path name. In other embodiments, the resource resolution service 136 may perform a resolution based at least in part on any other data associated with the resource request 124, including, for example, cookie parameters, form parameters, type of browser 160, type of operating system employed in the client 106, referring network sites, user location, user IP address, timestamp, time of year, and other data.

For resolution purposes, the resource resolution service 136 may consult a configuration file or other data such as the cascade filter configuration 145. One or more resource resolvers 129 (FIG. 1) may be employed to facilitate resource resolution for different types of data associated with the resource request 124 in various embodiments.

In box 409, the resource resolution service 136 determines whether data corresponding to the requested resource 121 (FIG. 1) exists in the resource group 148. As a non-limiting example, the resource resolution service 136 may determine whether a certain filename corresponding to the requested resource 121 exists within a directory corresponding to the resource group 148. If the resource resolution service 136 determines that the data corresponding to the requested resource 121 exists in the resource group 148, the resource resolution service 136 moves to box 412 and returns the resource group 148 as the resource location. Thereafter, the portion of the resource resolution service 136 ends.

If the resource resolution service 136 instead determines in box 409 that data corresponding to the requested resource 121 does not exist in the resource group 148, the resource resolution service 136 proceeds to box 415 and determines whether another resource group 148 is in the cascade. To this end, the resource resolution service 136 may consult a cascade configuration 154 (FIG. 1) corresponding to the resource group 148 that is mapped to the resource request 124. Alternatively, the resource resolution service 136 may examine the cascade configuration 154 of a current resource group 148 being examined.

If another resource group 148 is listed in the cascade, the resource resolution service 136 continues to box 418 and loads the next resource group 148 listed in the cascade. Thereafter, the resource resolution service 136 returns to box 409 and determines whether data corresponding to the requested resource 121 exists in the next resource group 148. If the resource resolution service 136 determines in box 415 that no other resource group 148 is provided in the cascade, the resource resolution service 136 moves to box 421 and returns an error indicating that the requested resource 121 could not be found. Subsequently, the portion of the resource resolution service 136 ends.

Figure 5:
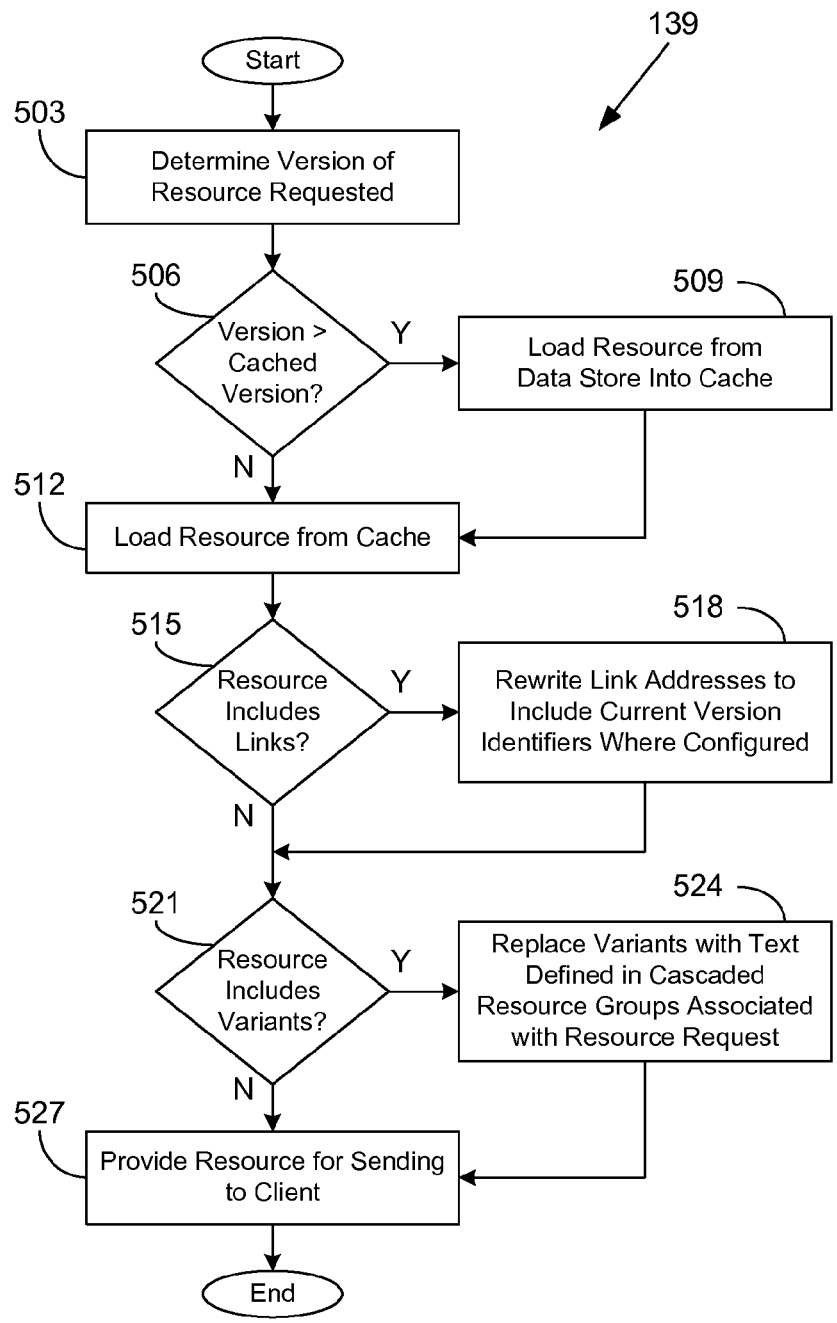

Turning next to FIG. 5, shown is a flowchart that provides one example of the operation of a portion of the resource generation service 139 according to various embodiments. It is understood that the flowchart of FIG. 5 provides merely an example of the many different types of functional arrangements that may be employed to implement the operation of the portion of the resource generation service 139 as described herein. As an alternative, the flowchart of FIG. 5 may be viewed as depicting an example of steps of a method implemented in the computing device 103 (FIG. 1) according to one or more embodiments. Although the flowchart of FIG. 5 is described as representing a portion of resource generation service 139, portions of the functionality shown in FIG. 5 may be performed by a resource generator 130 (FIG. 1) selected based at least in part on a type of resource 121 (FIG. 1) that is requested.

Beginning with box 503, the resource generation service 139 determines a version of the resource 121 that has been requested. For example, a version identifier may be embedded within the resource request 124 (FIG. 1). In box 506, the resource generation service 139 determines whether the requested version is newer than the version of the data corresponding to the resource 121 that is cached within the network site data cache 115 (FIG. 1). If the requested version is newer than the cached version, the resource generation service 139 continues to box 509 and loads the data corresponding to the resource 121 from the resource data 151 (FIG. 1) in the data store 112 (FIG. 1) into the network site data cache 115. The resource generation service 139 then moves to box 512.

If the requested version is not newer than the cached version of the data corresponding to the resource 121, the resource generation service 139 also proceeds to box 512. In box 512, the resource generation service 139 loads the data corresponding to the requested resource 121 from the network site data cache 115. In box 515, the resource generation service 139 determines whether the resource 121 includes links. For example, the resource 121 may comprise a network page or a network page template that includes hyperlinks. If the resource 121 includes links, the resource generation service 139 moves to box 518 and rewrites the link addresses or URLs to include current version identifiers where configured. For example, the resource generation service 139 may be configured, by way of the cascade filter configuration 145 (FIG. 1), to include version identifiers for certain file types or to exclude version identifiers for certain file types. The resource generation service 139 continues to box 521.

If the resource 121 does not include links, the resource generation service 139 also continues to box 521. In box 521, the resource generation service 139 determines whether the resource 121 includes variants. If the resource 121 includes variants, the resource generation service 139 proceeds to box 524 and replaces variant identifiers in the data comprising the resource 121 with text defined in the cascade of resource groups 148 that is associated with the resource request 124 (FIG. 1). The resource generation service 139 then proceeds to box 527.

If the resource generation service 139 determines in box 521 that the resource 121 does not include variants, the resource generation service 139 also proceeds to box 527. In box 527, the resource generation service 139 provides the resource 121 for sending to the client 106 (FIG. 1). Further, the resource generation service 139 may transform the data in some way in order to generate the resource 121 in a form for sending to the client 106. Thereafter, the portion of the resource generation service 139 ends.

Figure 6:
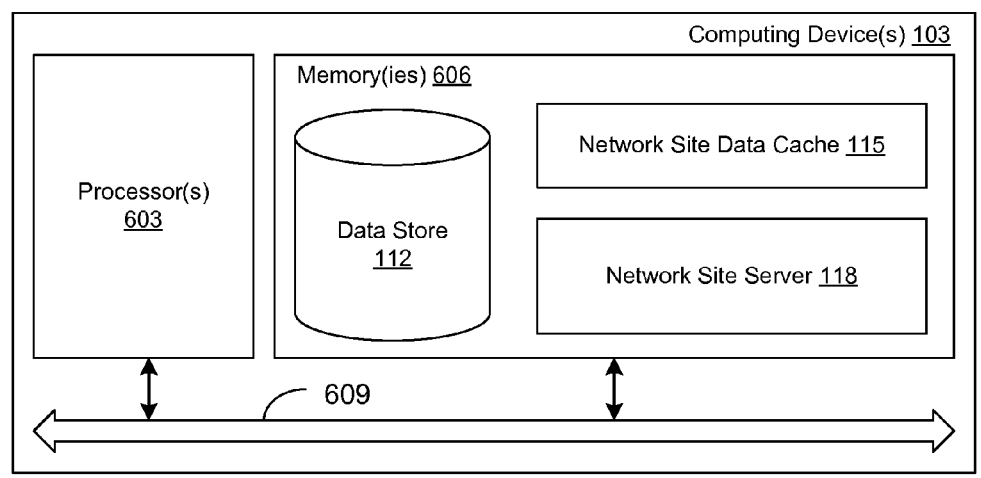
FIG. 6 is a schematic block diagram that provides one example illustration of a computing device employed in the networked environment of FIG. 1 according to various embodiments of the present disclosure.

With reference to FIG. 6, shown is a schematic block diagram of the computing device 103 according to an embodiment of the present disclosure. The computing device 103 includes at least one processor circuit, for example, having a processor 603 and a memory 606, both of which are coupled to a local interface 609. To this end, the computing device 103 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are a network site server 118 and potentially other applications. Also stored in the memory 606 may be a data store 112, a network site data cache 115, and other data. In addition, an operating system may be stored in the memory 606 and executable by the processor 603.

It is understood that there may be other applications that are stored in the memory 606 and are executable by the processors 603 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and the memory 606 may represent multiple memories 606 that operate in parallel processing circuits, respectively. In such a case, the local interface 609 may be an appropriate network 109 (FIG. 1) that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the network site server 118 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3-5 show the functionality and operation of an implementation of portions of the network site server 118. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 3-5 show a specific order of execution, it is understood that the order of execution may differ from that which is depicted. For example, the order of execution of two or more blocks may be scrambled relative to the order shown. Also, two or more blocks shown in succession in FIGS. 3-5 may be executed concurrently or with partial concurrence. Further, in some embodiments, one or more of the blocks shown in FIGS. 3-5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network site server 118, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a first computing device, wherein the program, when executed, causes the first computing device to at least:
   obtain a request for a resource from a second computing device, the request including a version identifier;
   resolve a location of resource data for generating the resource, wherein data associated with the request determines a cascaded resource group comprising a cascade configuration and a variants configuration, the cascade configuration specifying a sequenced listing of cascaded resource groups and the variants configuration defining a hierarchy of variants for replacement in the resource, and wherein the location is a first one of the sequenced listing of cascaded resource groups;
   resolve a variant in the resource data into a text string by determining a first one of the sequenced listing of cascaded resource groups in which a definition of the variant is present;
   transform a link to another resource within the resource data by encoding a version identifier of the another resource within the link;
   generate the resource from the resource data for presentation to the second computing device, wherein the resource data is loaded from a data cache when the version identifier is less than or equal to a version identifier associated with the resource data in the data cache, and the resource data is loaded from a data store when the version identifier is greater than the version identifier associated with the resource data in the data cache; and
   substitute a variant from the hierarchy of variants into the resource in place of an identifier in the resource during generation of the resource.

2. The non-transitory computer-readable medium of claim 1, wherein the cascaded resource group corresponds to a network site.

3. The non-transitory computer-readable medium of claim 1, wherein the program further causes the computing device to at least:
   monitor the data store for an addition of a new resource; and
   update the data cache to include the new resource from the data store.

4. A system, comprising:
   a data store and a first computing device wherein the data store is accessible by the first computing device; and
   the computing device comprises at least one data cache and is configured to at least:
      obtain a request for a resource from a second computing device, the request including a version identifier;
      resolve a location of a resource data for generating the resource, wherein data associated with the request determines a cascaded resource group comprising a cascade configuration and a variants configuration, wherein the cascade configuration comprises listing of resource groups that define a cascade for the cascaded resource group, the variants configuration defines a hierarchy of variants of the resource data for replacement in the resource, and the location is one of the listing of resource groups in which the resource data is present; and
      generate the resource from the resource data for presentation to the client based at least in part on the cascade configuration and the variants configuration, wherein the resource data is loaded from the respective at least one data cache when the version identifier is less than or equal to a version identifier associated with the resource data in the respective at least one data cache, and the resource data is loaded from the data store when the version identifier is greater than the version identifier associated with the resource data in the respective at least one data cache.

5. The system of claim 4, wherein the data associated with the request comprises a domain name, and the cascaded resource group corresponds to a network site available at the domain name.

6. The system of claim 4, wherein the data associated with the request comprises a cookie parameter, and the cascaded resource group corresponds to a network site that is served by the first computing device when the cookie parameter is present.

7. The system of claim 4, wherein the version identifier comprises a timestamp.

8. The system of claim 4, wherein the resource data comprises a file, and the cascaded resource group comprises a plurality of directories.

9. The system of claim 4, wherein the resource data is deployable to the data store, and the first computing device is further configured to at least:
   monitor resource data that is added to the data store; and
   copy the resource data that is added to the data store to the respective at least one data cache.

10. The system of claim 4, wherein the first computing device is further configured to at least execute one of a plurality of resource generators based at least in part on a filename extension of the resource when generating the resource from the resource data.

11. The system of claim 10, wherein the resource comprises a network page, the resource data comprises a network page template, and at least one of the resource generators is configured to generate the network page based at least in part on the network page template.

12. The system of claim 10, wherein the resource comprises a first file, the resource data comprises a second file, and at least one of the resource generators is configured to generate the first file based at least in part on the second file.

13. The system of claim 4, wherein the resource comprises a network page, and the first computing device is further configured to at least modify a resource address embedded in the network page to include a version identifier corresponding to another resource that is associated with the resource address.

14. The system of claim 13, wherein the resource data for generating the network page includes a directive indicating the resource address to be modified.

15. A computer-implemented method comprising:
   obtaining, in at least one computing device, a request for a network page;
   identifying, in the at least one computing device, an ordered list of network resource groups from data associated with the request;
   determining, in the at least one computing device, a first one of the ordered list of network resource groups that includes network page data for generating the network page;
   resolving, in the at least one computing device, a variant in the network page data into a text string by determining a first one of the ordered list of network resource groups that includes a definition of the variant, wherein the definition of the variant defines a hierarchy of variants for replacement in the resource; and
   generating, in the at least one computing device, the network page from the network page data, the variant being replaced in the network page with the text string selected from the hierarchy of variants.

16. The computer-implemented method of claim 15, further comprising:
   loading, in the at least one computing device, the network page data from a data cache when a version identifier associated with the data cache is greater than or equal to a version identifier associated with the request; and
   loading, in the at least one computing device, the network page data from a data store when the version identifier associated with the data cache is less than the version identifier associated with the request.

17. The computer-implemented method of claim 15, wherein the definition of the variant is included in a file associated with the respective network resource group.

18. The computer-implemented method of claim 15, wherein the data associated with the request corresponds to a uniform resource locator (URL).

19. The computer-implemented method of claim 15, wherein the data associated with the request corresponds to a cookie.

20. The computer-implemented method of claim 15, further comprising modifying, in the at least one computing device, a link to a network resource by encoding a version identifier of the network resource in the link.

* * * * *